BARRIER GRID STORAGE TUBE CHARGE PATTERN REGENERATION

Filed Aug. 2, 1955 4 Sheets-Sheet 1

EQUILIBRIUM

ELEMENT POSITIVE CHARGING IN NEGATIVE DIRECTION

ELEMENT NEGATIVE CHARGING IN POSITIVE DIRECTION

INVENTOR
M. CHRUNEY
BY R. B. Ardis
ATTORNEY

INVENTOR
M. CHRUNEY
BY R. B. Ardis
ATTORNEY

INVENTOR
M. CHRUNEY
BY R. B. Ardis
ATTORNEY

BARRIER GRID STORAGE TUBE CHARGE PATTERN REGENERATION

Filed Aug. 2, 1955 4 Sheets-Sheet 4

INVENTOR
M. CHRUNEY
BY R. B. Ardis
ATTORNEY

United States Patent Office 2,871,398

Patented Jan. 27, 1959

2,871,398

BARRIER GRID STORAGE TUBE CHARGE PATTERN REGENERATION

Michael Chruney, Berkeley Heights, N. J., assignor to Bell Telephone Laboratories, Incorporated, New York, N. Y., a corporation of New York Application August 2, 1955, Serial No. 525,981

13 Claims. (Cl. 315—8.5)

This invention relates generally to barrier grid storage tube circuits and more particularly to circuits for continuously regenerating the charge pattern of a barrier grid storage tube.

A principal object of the invention is to permit the charge pattern of a barrier grid storage tube to be held for an extended period of time.

A related object is to permit the charge pattern of a barrier grid storage tube to be changed one bit at a time.

A barrier grid storage tube such as that disclosed, for example, in U. S. Patent 2,675,499, issued April 13, 1954, to R. W. Sears, is primarily a device for the rapid storage of electrical information in a digital basis. In typical form it contains an electron gun, an electrostatic deflection system, and a storage surface with which is associated both an input connection and an output connection. In operation, information is stored in the form of a charge pattern on the storage surface and is either written on or read off, by way of the input and output connections respectively, as the electron beam scans and comes to rest at regular intervals on each of a large number of elemental areas on the storage surface.

Although binary information can be both written into and read off from a barrier grid storage tube in an extremely short time, such a tube is usually not adapted either to retain stored binary information over a very long period of time or to retain a stored charge pattern after it has been detected or read in any manner. A stored pattern tends to dissipate of its own accord after a period of time and, furthermore, any reading of a stored charge pattern results in its erasure. There are, however, many instances in telephone and computer work in which it is desirable to retain a stored charge pattern for a greater length of time and have it persist even through one or more readings.

The present invention not only permits a charge pattern to be retained on the storage surface of a barrier grid storage tube for an indefinite length of time and permits it to be retained through an indefinite number of readings, but also permits the information stored on any elemental area of the storage surface to be changed independently of the information stored on any other elemental area or areas. The range of applications open to the barrier grid storage tube is thereby increased many fold and the specific advantages of the barrier grid tube with respect to the rapidity with which a large quantity of binary information can be written in and read out are made available to a much larger segment of the electronic art.

In its principal aspect, the invention takes the form of a combination which includes a barrier grid storage tube and a circuit arrangement for continuously and cyclically reading the binary information stored on each elemental storage area and restoring a charge to each elemental area immediately after it has been withdrawn therefrom, leaving the spot unchanged if it is initially found with no charge. In this manner a 1 is regenerated whenever a 1 is read upon an individual elemental storage area while a 0 is regenerated whenever a 0 is read. In accordance with the invention, this circuit arrangement includes a source of reading pulses timed to occur once during the initial portion of each interval during which the electron beam is stationary upon an elemental storage area, a source of writing pulses timed to occur once during a portion of each interval following a reading pulse, a coincidence gate coupled to the output connection of the tube and to the source of reading pulses in order to produce a pulse whenever a charge in excess of a predetermined value is found during a reading interval, a pulse generator connected to receive pulses from the gate and, whenever a pulse is so received, to produce a pulse overlapping both the leading and the trailing edges of the next subsequent writing pulse in time, another coincidence gate connected to the pulse generator and to the source of writing pulses to produce an output pulse whenever a pulse is supplied from the pulse generator during a writing interval, and means to couple any pulses produced by the second gate to the barrier grid storage tube input connection.

An additional feature of the invention includes means to permit the binary information stored on any elemental storage area of a barrier grid tube to be changed without affecting any other elemental storage area. By such means, a 0 can be written where a 1 existed before, and a 1 can be written where a 0 existed before. This feature of the invention supplements the regenerative feature described above and, as a result, the barrier grid tube is permitted to retain a stored charge pattern indefinitely as long as there is no additional input signal to change it but the information stored on each of the elemental storage areas can be changed independently of other such areas whenever the requisite change signal appears. In accordance with this feature of the invention, means is provided to superimpose pulses of opposite polarity upon those produced by the pulse generator, permitting a 0 to be written where a 1 had been written before, and means is provided to supply pulses to the second gate which are of the same polarity of those produced by the pulse generator, permitting 1 to be written where a 0 had existed before.

Additional objects and features of the present invention will become apparent upon a study of the following detailed description of a specific embodiment. In the drawings.

Figure 1:
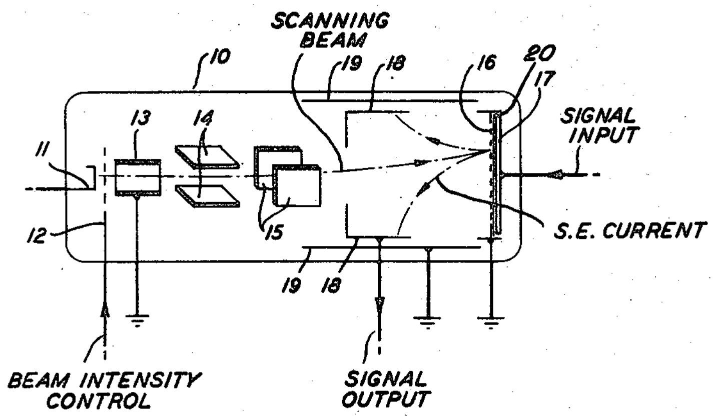
Fig. 1 illustrates in diagrammatic form a typical example of a barrier grid storage tube.
Figure 1A:
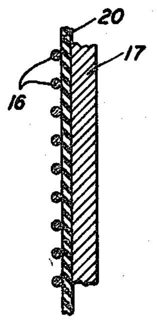
Fig. 1A is an enlarged representation of the storage section of the barrier grid tube shown in Fig. 1.

The typical barrier grid storage tube shown in Fig. 1 comprises an evacuated envelope 10, an electron emissive cathode 11, a beam intensity control electrode 12, a beam accelerating anode 13, a pair of vertical deflecting plates 14, a pair of horizontal deflecting plates 15, and a storage section. The storage section includes a barrier grid 16, a storage element 20, a back plate 17 which serves as an input connection, a collector electrode 18 which serves as an output connection, and a surrounding shield 19. As illustrated in more detail in Fig. 1A, the storage element 20 is an insulating plate of mica which separates the barrier grid 16 from the conducting back plate 17.

Figure 1B:
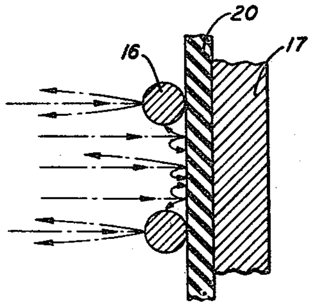
Fig. 1B is a still more enlarged representation of the storage section of the tube shown in Fig. 1 and illustrates the primary and secondary electron flow at the storage surface.
Figure 1C:
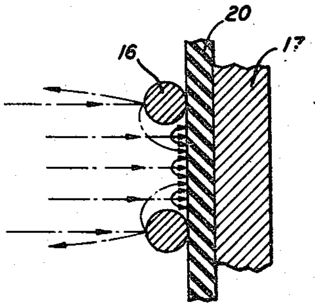
Figs. 1C and 1D are substantially the same as Fig. 1B but illustrate the mechanism for the storage of negative and positive charges, respectively.
Figure 1D:
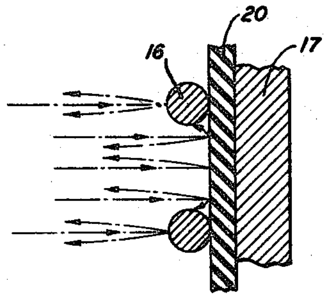

Operation of the barrier grid storage tube illustrated in Fig. 1 is best explained with the aid of Figs. 1B, 1C, and 1D, each of which is an enlarged view of barrier grid 16, storage element 20, and back plate 17. Under conditions of equilibrium (Fig. 1B), the number of primary electrons striking storage element 20 is substantially equal to the number of secondary electrons leaving. As the back plate 17 is made positive (Fig. 1C) the front surface (that facing the beam) of the element is, by capacitive coupling, made positive by a similar amount. Under such conditions, when the beam strikes the element the secondaries that are emitted from the element and the barrier grid are drawn back to the element, accumulating there until the element is again at equilibrium. Turning off the beam and removing the back plate potential then leaves the element at a negative potential. In this manner, writing with a positive input signal actually stores a negative charge. When the beam again hits this spot for reading, the element is negative and the secondaries that are emitted are repelled from the element to other positions of the tube. When enough secondary electrons have been repelled to bring the element back to equilibrium, reading (and also erasure) is complete. Collctor electrode 18 (Fig. 1) is placed to intercept at least some of the repelled secondaries from the element, so that reading under these conditions gives a negative output pulse from the collector electrode.

The conditions which have just been described apply to a positive-going writing signal and a negative-going reading signal. When a negative writing signal (Fig. 1D) is used, the secondary electrons are repelled from the element, leaving the element in a positively changed condition upon the removal of the writing signal. Reading this spot then gives a positive-going output signal.

In operating the barrier grid storage tube illustrated in Fig. 1, either positive or negative writing pulses may be used. Because of the unsymmetrical secondary emission characteristics of storage element 20, positive writing gives a slightly faster writing time than negative writing. The erasing time is faster for negative writing, however, than for positive writing.

Under typical operating conditions for the barrier grid tube shown in Fig. 1, electron emissive cathode 11 is connected to a negative potential and beam accelerating anode 13, barrier grid 16, and shield 19 are grounded. Control signals of various kinds may then be applied to beam intensity control electrode 12, vertical deflecting plates 14, and horizontal deflecting plates 15. Back plate 17 functions as a signal input (writing) connection and collector electrode 18 as a signal output (reading) connection.

As has already been pointed out, once a charge pattern has been impressed upon storage element 20 of the barrier grid tube illustrated in Fig. 1 it normally will not remain there indefinitely. Reading the charge pattern at any time results in its erasure and, furthermore, the charge pattern is likely to dissipate of its own accord after a short period of time. A principal feature of the present invention provides for the continuous regeneration of the charge pattern in a barrier grid storage tube of the type described and not only prevents its dissipation through the passage of time but also permits it to be read any number of times without being lost. Another feature of the invention permits the stored information to be changed one bit at a time whenever it is so desired.

Figure 2:
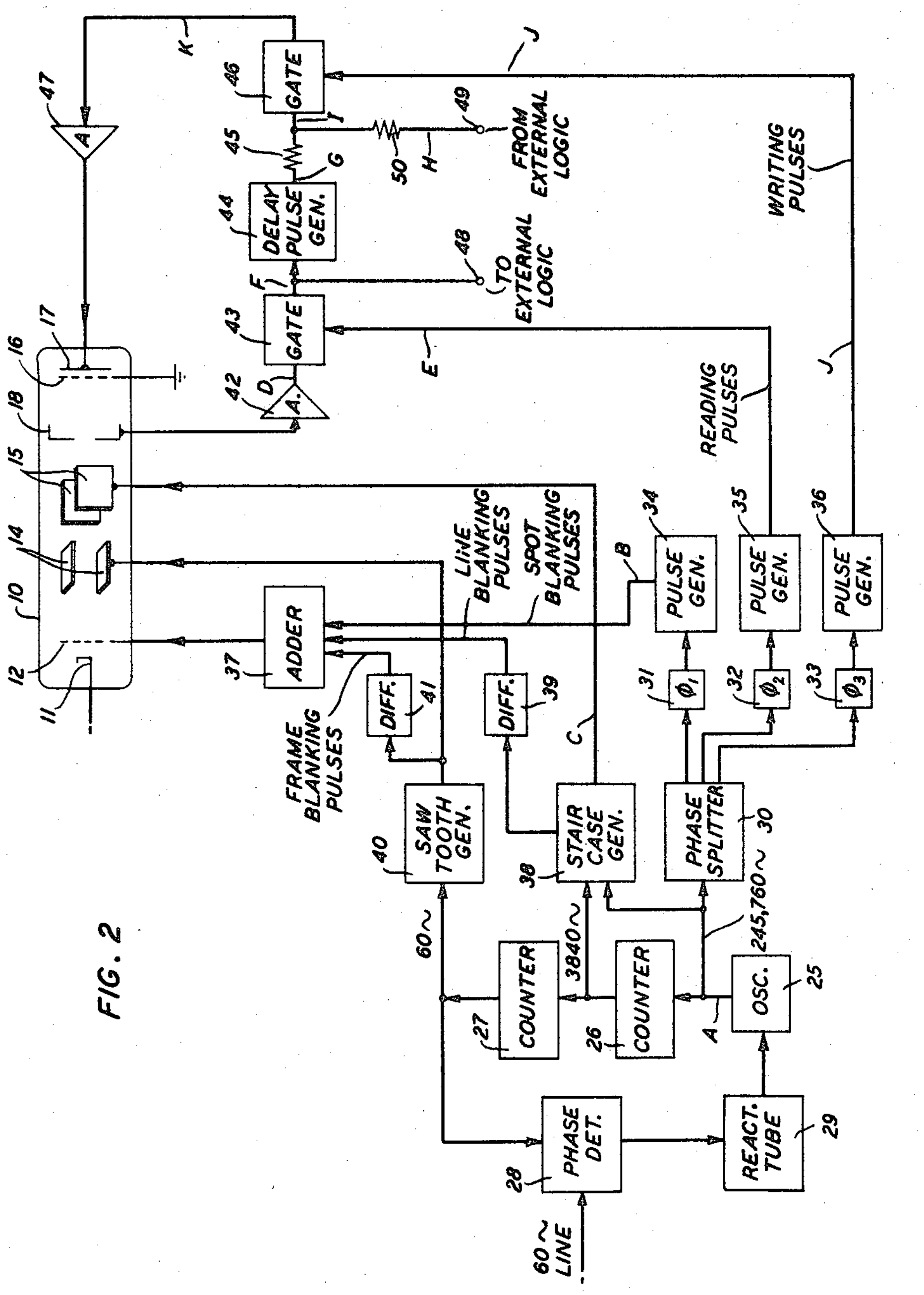
Fig. 2 illustrates a specific embodiment of the present invention in block diagram form.

The embodiment of the invention illustrated in Fig. 2 provides a continuous regeneration of the stored charge pattern which, in turn, involves moving the beam to an elemental area of the storage surface, reading that spot to see if information is stored, putting it back on if there is a bit stored, and then moving to the nex spot and repeating the operation. After every spot of the storage surface is covered in succession in this manner, the process repeats itself.

The storage tube in Fig. 2 is the barrier grid tube illustrated in detail in Fig. 1, but is shown in more simplified form for convenience. In the circuit connections illustrated, an oscillator 25 operating at 245,760 cycles per second is counted down through a 6-stage binary counter 26 to 3840 cycles per second, which is the horizontal line rate at which the storage surface of the tube is scanned. This, in turn, is counted down through another 6-stage binary counter 27 to 60 cycles per second to give the vertical frame rate. The 60 cycle frame rate is compared in a phase detector 28 with a standard 60 cycle line supply and the output operates a reactance tube circuit 29 which controls oscillator 25 at the exact multiple of the 60 cycle line frequency.

The 245,760 cycle per second output of oscillator 25 at A (illustrated at line A of Fig. 2A) is split into three separate outputs by a phase splitter 30. These outputs are fed through respective circuits 31, 32, and 33, each of which includes an RC phase-shifting network, an amplifier, and a wave squarer, to a respective set of pulse generators 34, 35, and 36. In this manner, three pulse outputs (labeled $\varphi_1$, $\varphi_2$ and $\varphi_3$, respectively) are obtained, each phased approximately 120 degrees from the others. The pulses produced by $\varphi_1$ and $\varphi_3$ generators 34 and 36 are substantially 120 degrees in length, while those produced by $\varphi_2$ generator 35 are much shorter, amounting only to about 45 degrees in length.

Pulse generator 34 operates in the manner described to provide spot blanking pulses at B (illustrated at line B of Fig. 2A) which are passed through an addder 37 to beam intensity control electrode 12 of the barrier grid storage tube. At the same time, the 245,760 cycle output of oscillator 25 and the 3840 cycle output of counter 26 are supplied to the input terminals of a staircase generator 38. The output of the latter device at C (illustrated at line C of Fig. 2A) is in the form of a step deflection voltage and is supplied to the horizontal deflection plates 15 of the barrier grid 2. In addition, a differentiator 39 is connected to a point in the staircase generator 38 to which a sawtooth wave of 3840 cycles per second is available to obtain line blanking pulses. These are coupled through adder 37 to beam intensity electrode 12.

From the counter 27 a 60 cycle output is supplied to a sawtooth generator 40, the output of which is supplied to vertical deflection plates 14 of the barrier grid storage tube. In addition, the output of sawtooth generator 40 is passed through a differentiator 41 to provide frame blanking pulses which are also applied to beam intensity control electrode 12 through adder 37.

The portion of the control circuit illustrated in Fig. 2 which has already been described is a conventional circuit for scanning the storage element of the barrier grid tube and for blanking the beam at all times except when it is stationary on a particular elemental storage area. With such a scanning and blanking arrangement, and with no more than conventional arrangements for writing and reading, the stored information is removed and lost from the storage tube element whenever it is read. The present invention replaces conventional writing and reading circuits and avoids this loss by allowing the information to be read and used several times or to be periodically looked at and held for a long period of time.

In the embodiment of the invention illustrated in Fig. 2, an amplifier 42 has its input connected to the collector or output electrode 18 of the barrier grid storage tube. Amplifier 42 is provided with an odd or even number of stages as required to give a positive-going output pulse when a signal is present. The output of amplifier 42 at D (illustrated, for example, in line D of Fig. 2A) is connected to one of the inputs of an electronic coincidence gate 43, the other input E of which is connected to receive reading pulses (illustrated in line E of Fig. 2A) from pulse generator 35. The presence of a pulse on both the input at D from amplifier 42 and the input at E from reading pulse generator 35 is required for gate 43 to generate an output pulse. Gate 43 may include, for example, a multigrid vacuum tube with separate grids used as the input electrodes. Both input pulses must then rise above the cutoff of the respective grids used before any output voltage will occur.

Coincidence gate 43 is used to eliminate any extraneous disturbance occurring during writing and blanking and to derive an output pulse which has clean rise and fall characteristics. The output of gate 43 at F (illustrated, for example, in line F of Fig. 2A) is used to trigger a delay-pulse generator 44. Delay-pulse generator 44 is a pulse generator which is triggered by the trailing edge of each pulse at F produced by gate 43 and is operated only if a charge exists on the site being read in the storage tube. In this manner, the information pulse at F is temporarily held while sufficient time is taken to discharge the storage site to a level of equilibrium. The total time taken to read or discharge the storage site in this manner is determined by the period from the time the storage tube is unblanked or turned on to the time writing commences.

Figure 2A:
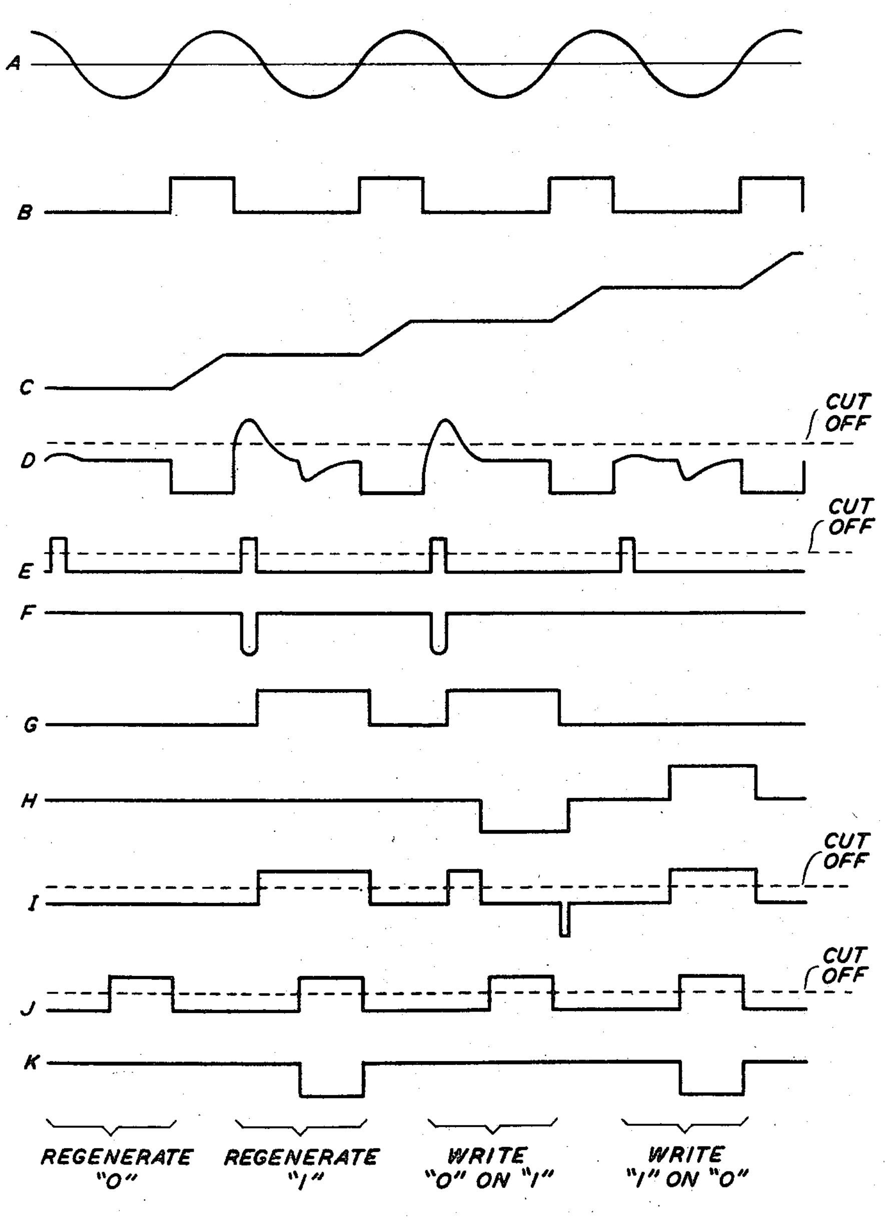
Fig. 2A shows wave forms found in various portions of the embodiment of the invention illustrated in Fig. 2.

Delay-pulse generator 44 is set to produce an output pulse that extends, in time, from the trailing edge of the output pulse from gate 43 to just beyond the trailing edge of the next succeeding writing pulse from generator 36 at J (illustrated in line J of Fig. 2A). This output pulse from delay-pulse generator 44 at G (illustrated, for example, in line G of Fig. 2A) passes through a series resistor 45 to one of the inputs I of another electronic coincidence gate 46. Gate 46 is substantially the same as gate 43 but, instead of reading pulse generator 35, has writing pulse generator 36 connected to its other input at J. The presence of both a pulse on the input I from delay-pulse generator 44 and a writing pulse on the input J from pulse generator 36 is required for gate 46 to produce an output pulse. Again if a multigrid vacuum tube is used as the principal element, both pulses must rise above cutoff for the respective grids for an output pulse to occur.

The output pulses produced by gate 46 at K (illustrated in line K of Fig. 2A) are inverted copies of the writing pulses supplied at J from writing pulse generator 36. The length of the output pulses from gate 46 at K is thus controlled directly by the length of the writing pulses of the generator 36 at J. The output pulses are then fed into a driving amplifier 47 which applies a signal of the proper amplitude and polarity to back plate 17 of the storage tube to rewrite the original information onto the storage element. Driving amplifier 47 contains either an even or an odd number of stages as required for deriving the desired writing signal polarity.

In its normal operation, the embodiment of the invention illustrated functions either to regenerate a 0 (condition of no stored charge) on the storage surface of the barrier grid tube or to regenerate a 1 (condition of stored charge). This operation may best be described with reference to those portions of Fig. 2A which have already been mentioned parenthetically. The left-hand half of the figure (representing no pulses on line H, which will be described later) illustrates first the regeneration of a 0 on a spot having an initial charge.

As illustrated in line D of Fig. 2A, the first spot read is found to have stored a 0. Even though some minor disturbances may appear at the output of amplifier 42, they fail to rise about the cutoff of the input terminal at D of gate 43. For this reason, no output pulse is generated at F by gate 43. Similarly, delay-pulse generator 44 is not triggered and no input pulse appears at the input at I of gate 46 simultaneously with a writing pulse at J. As shown in line K, no output pulse is generated by gate 46 and passed through driving amplifier 47 to the back plate of the barrier grid tube. The binary information regenerated is, therefore, another 0. The spot is then blanked and the beam moves on to the next elemental storage area.

As shown in line D, the second spot upon which the beam comes to rest contains a charge, having previously been made to store a 1. Since a pulse appears at both inputs to gate 43, an output pulse is generated at F. This pulse triggers delay pulse generator 44 causing a pulse to appear at input I to gate 46 at the same time that a writing pulse is supplied to input J. As illustrated in line K, gate 46 generates an output pulse which causes a 1 to be rewritten on the portion of the storage element in question before the beam moves on to the next spot.

In addition to the elements which have already been described, the embodiment of the invention illustrated in Fig. 2 is also provided with a terminal 48 connected to point F on the output side of gate 43 and a terminal 49 connected through a resistor 50 to point I at the input of gate 46. In this manner, the pulses illustrated in line F of Fig. 2A can be fed to an external logic circuit which uses the stored information and determines whether to allow the regenerative circuit to (1) regenerate a 0, (2) regenerate a 1, (3) write a 0 where previously a 1 had been stored, or (4) write a 1 where previously a 0 had been stored. The output from this external logic circuit is coupled to point I on the input side of gate 46 through terminal 49 and resistor 50. The latter element cooperates with resistor 45 to superimpose pulses from the external logic circuit upon those produced by delay-pulse generator 44.

The pulses applied from the external logic circuit through resistor 50 are illustrated in line H of Fig. 2A and the resulting combination at I with the pulses from delay-pulse generator 44 at line I. As shown in line H, the pulse applied from the external logic circuit is negative-going whenever it is desired to write a 0 where previously a 1 had been stored, and positive-going whenever it is desired to write a 1 where previously a 0 had been stored.

The operation of the embodiment of the invention shown in Fig. 2 whenever either of these latter two operations are to be performed is illustrated by the wave forms appearing in the right-hand half of Fig. 2A. In the series of spots scanned in the illustrated examples, the third and fourth spots are involved in these latter operations.

As shown in line D of Fig. 2A, the third spot is found to have stored a 1 when the beam comes to rest upon it. An output pulse is, therefore, generated at F by gate 43 during the reading interval and delay-pulse generator 44 is triggered (as shown in line G). In order to perform the function of writing 0 on 1, a negative-going pulse from H is superimposed at I upon the output of delay-pulse generator 44, canceling the pulse provided by the latter during the writing interval. As a result, no pulse appears at input I to gate 46 while a writing pulse appears at input J and no output pulse is generated at K. In this manner, the 1 previously stored on the elemental storage area in question is replaced by a 0 before the beam moves on to the next spot.

In the final example shown in Fig. 2A, the spot is found with a 0 stored (as shown in line D) and no output pulse is produced at F by gate 43 during the reading interval. While no pulse is generated at G by delay-pulse generator 44, the function of writing 1 on 0 is initiated by a positive-going pulse from H applied at I through resistor 50. This pulse overlaps the writing pulse at J in time and an output pulse is produced at K by gate 46 for transmission to the back plate 17 of the storage tube. The 0 which was initially stored on the spot is thus replaced by a 1 before the beam moves on to the next spot.

Figure 3:
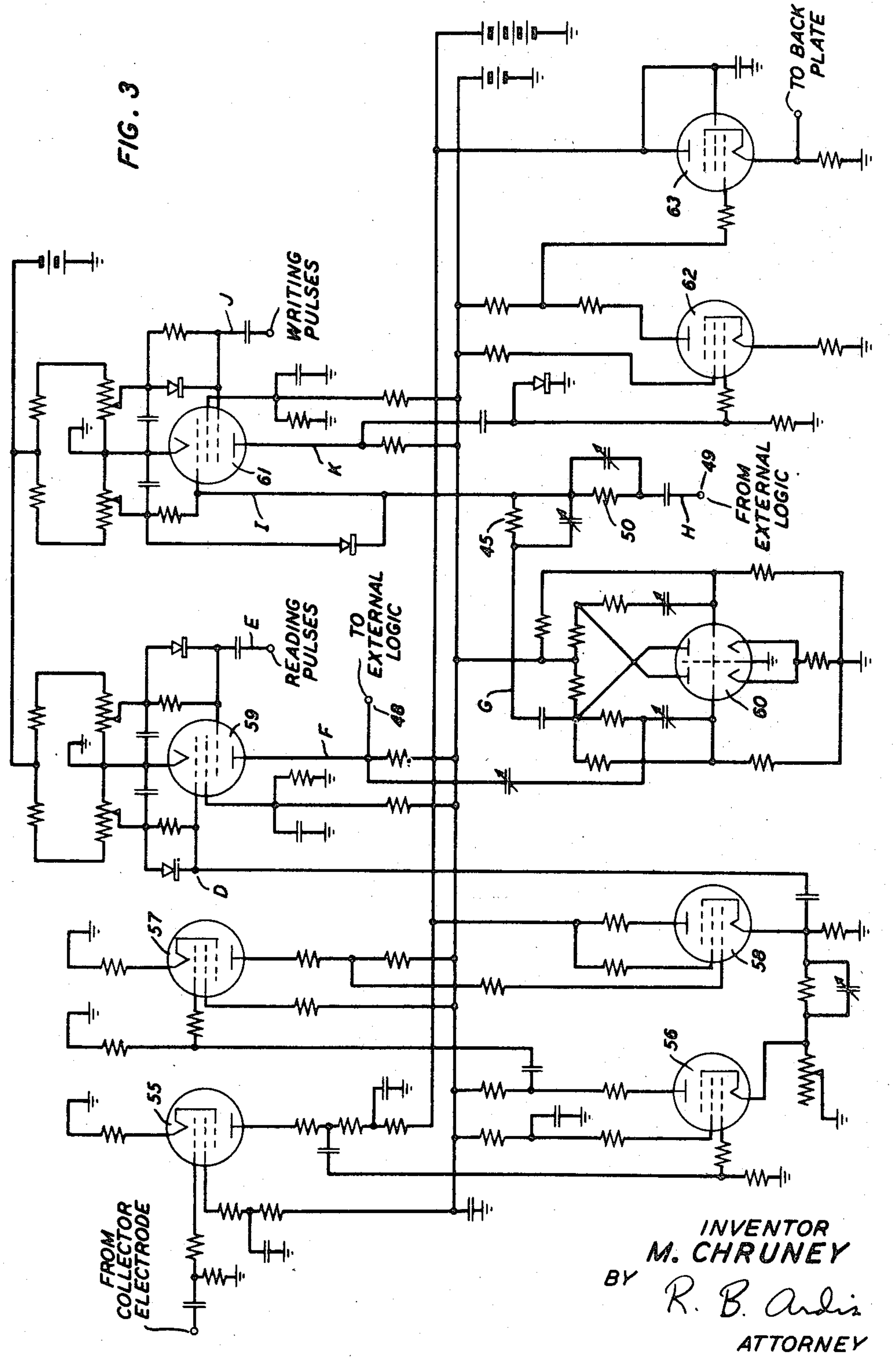
Fig. 3 is a schematic diagram of the charge regeneration portion of the embodiment of the invention illustrated in Fig. 2.

A schematic diagram of the charge regeneration portion of the embodiment of the invention shown in Fig. 2 appears as Fig. 3. There, the illustrated circuit includes the regeneration path between the collector electrode 18 and the back plate 17 of the storage tube, along with terminals for the application of the reading and writing timing pulses and for connection to an external logic circuit in the manner described. Amplifier 42 is a three-stage vacuum tube amplifier made up of pentodes 55, 56, and 57 plus an additional cathode follower output stage formed by a fourth pentode 58. Coincidence gate 43 is an electronic gate circuit formed by a pentode 59, with the storage tube output pulses from amplifier 42 and the reading pulses from pulse generator 35 applied to respectively different grids. Delay-pulse generator 44 is a cathode-coupled multivibrator using a double triode 60 and, as mentioned above, is triggered off the trailing edge of the output pulse produced by gate 43. The second coincidence gate 46 is also electronic in nature and is formed by a pentode 61, with output pulses from delay-pulse generator 44 and writing pulses from pulse generator 36 applied to respectively different grids. Driving amplifier 47 includes a pair of pentodes 62 and 63, the second of which forms a cathode follower output stage.

The letter symbols used in Fig. 2 to refer to corresponding lines of Fig. 2A to illustrate the mode of operation of the invention also appear in Fig. 3 to serve the same purpose.

It is to be understood that the above-described arrangements are illustrative of the application of the principles of the invention. Numerous other arrangements may be devised by those skilled in the art without departing from the spirit and scope of the invention.

What is claimed is:

1. In combination, a barrier grid storage tube having a secondary emissive storage surface, means to direct a beam of electrons recurrently upon an elemental area of said surface, an input connection for supplying binary information to said area while said beam is maintained thereon, and an output connection for withdrawing binary information from said area while said beam is maintained thereon, and means to restore binary information to said area immediately after it has been withdrawn therefrom which comprises a first pulse generator producing a pulse during the initial portion of each of said intervals during which said beam is substantially stationary upon said area, a second pulse generator producing a pulse during a portion of each of said intervals following the pulse from said first generator, a first coincidence gate coupled to said output connection and said first pulse generator to produce a pulse whenever a charge in excess of a predetermined value is found on said area during the life of a pulse from said first generator, a third pulse generator connected to receive pulses from said first gate and, during each of said intervals in which a pulse is so received, produce a pulse coexisting in time with at least a portion of the next subsequent pulse from said second generator, a second coincidence gate coupled to said third pulse generator and said second pulse generator to produce a pulse whenever a pulse is produced by said third pulse generator during the life of a pulse from said second generator, and means to supply pulses from said second gate to said input connection.

2. A combination in accordance with claim 1 in which said third pulse generator produces a pulse overlapping in time both the leading and trailing edges of the next subsequent pulse from said second generator.

3. A combination in accordance with claim 1 in which said third pulse generator is triggered by the trailing edge of each pulse received from said first gate.

4. In combination, a barrier grid storage tube having a secondary emissive storage surface, means to direct a beam of electrons recurrently upon an elemental area of said surface, an input connection for supplying a charge to said area while said beam is maintained thereon, and an output connection for withdrawing any charge found on said area while said beam is maintained thereon, and means to restore a charge to said area immediately after it has been withdrawn therefrom, while leaving said area unchanged if it has been found in that condition, which comprises a first pulse generator producing a pulse during the initial portion of each of said intervals during which said beam is substantially stationary upon said area, a second pulse generator producing a pulse during a portion of each of said intervals following the pulse from said first generator, a first coincidence gate coupled to said output connection and said first pulse generator to produce a pulse whenever a charge in excess of a predetermined value is found on said area during the life of a pulse from said first generator, a third pulse generator connected to receive pulses from said first gate and, during each of said intervals in which a pulse is so received, produce a pulse coexisting in time with at least a portion of the next subsequent pulse from said second generator, a second coincidence gate coupled to said third pulse generator and said second pulse generator to produce a pulse whenever a pulse is produced by said third pulse generator during the life of a pulse from said second generator, and means to supply pulses from said second gate to said input connection.

5. A combination in accordance with claim 4 in which the pulses produced by said second and third pulse generators are of the same predetermined polarity.

6. A combination in accordance with claim 4 in which the pulses produced by said second and third pulse generators are of the same predetermined polarity and which includes means to superimpose pulses of the opposite polarity upon those produced by said third generator, whereby no charge is restored to said elemental area while said beam is maintained thereon even though a charge had previously been withdrawn therefrom.

7. A combination in accordance with claim 4 in which the pulses produced by said second and third pulse generators are of the same predetermined polarity and which includes additional means to supply pulses of the same polarity to said second gate, whereby a charge is impressed upon said elemental area while said beam is maintained thereon even though no charge had previously been withdrawn therefrom.

8. In combination, a barrier grid storage tube having a secondary emissive storage surface, means to direct a beam of electrons recurrently upon an elemental area of said surface, an input connection for writing binary information onto said area while said beam is maintained thereon, and an output connection for reading the binary information contained on said area while said beam is maintained thereon, and means to regenerate a 1 on said area immediately after a 1 has been read thereon or regenerate a 0 on said area immediately after a 0 has been read thereon which comprises a source of reading pulses timed to occur once during the initial portion of each of said intervals during which said beam is substantially stationary upon said area, a source of writing pulses timed to occur during a portion of each of said intervals following one of said reading pulses, a first coincidence gate coupled to said output connection and said source of reading pulses to produce a pulse whenever a 1 is found on said area during the life of a reading pulse, a pulse generator connected to receive pulses from said first gate and, during each of said intervals in which a pulse is so received, produce a pulse overlapping in time both the leading and the trailing edges of the next subsequent writing pulse, a second coincidence gate connected to said pulse generator and said source of writing pulses to produce a pulse whenever a pulse is produced by said pulse generator during the life of a writing pulse, and means to couple any pulses produced by said second gate to said input connection.

9. A combination in accordance with claim 8 which includes means to superimpose pulses of opposite polarity upon those produced by said pulse generator, whereby a 0 is written on said elemental area while said beam is maintained thereon even though a 1 had previously been read therefrom.

10. A combination in accordance with claim 8 which includes means to supply pulses to said second gate of the same polarity as those provided by said pulse generator, whereby a 1 is written on said elemental area while said beam is maintained thereon even though a 0 had previously been read therefrom.

11. In combination, a barrier grid storage tube having a secondary emissive storage surface, means to direct a beam of electrons recurrently upon an elemental area of said surface, an input connection for supplying a charge to said area while said beam is maintained thereon, and an output connection for withdrawing any charge found on said area while said beam is maintained thereon, and means to restore a charge to said area immediately after it has been withdrawn therefrom which comprises means coupled to said output connection to produce a first pulse of direct current during the initial portion of each time interval during which said beam is substantially stationary upon said area whenever said beam finds said area with a charge in excess of a predetermined value, and means coupled to said input connection and triggered by said first pulse to produce a second pulse of direct current during the remaining portion of each of said time intervals and supply it to said input connection.

12. In combination, a barrier grid storage tube having a secondary emissive storage surface, means to direct a beam of electrons recurrently upon an elemental area of said surface, an input connection for supplying a charge to said area while said beam is maintained thereon, and an output connection for withdrawing any charge found on said area while said beam is maintained thereon, and means to restore a charge to said area immediately after it has been withdrawn therefrom which comprises means coupled to said output connection to produce a first pulse of direct current during the initial portion of each time interval during which said beam is substantially stationary upon said area whenever said beam finds said area with a charge in excess of a predetermined value, means triggered by said first pulse to produce a second pulse extending from the trailing edge of said first pulse to at least the end of said time interval, and means coupled to said input connection and triggered by said second pulse to produce a third pulse of direct current during the portion of said time interval following said first pulse and supply it to said input connection.

13. In combination, a barrier grid storage tube having a secondary emissive storage surface, means to direct for a predetermined time interval a beam of electrons upon an elemental area of said surface, an input connecdrawing any charge found on said area while said beam is maintained thereon, an output connection for withdrawing any charge found on said area whille said beam is maintained thereon, first means coupled to said output connection for withdrawing during the initial portion only of said interval any charge found on said area and producing outputs of first and second kinds whenever said charge is in excess of and less than, respectively, a predetermined value, an output terminal on said first means for making available both of said kinds of outputs, second means coupled to said terminal for producing during the remaining portion of said interval respective outputs in response to both of said kinds of outputs, gating means having an enabling input which is energized during said remaining portion of said interval, means connecting said second means to said gating means for applying said second means outputs as inputs to said gating means, said connecting means having an input terminal for receiving external signals for applying inputs other than said second means outputs to said gating means, and means for applying the output from said gating means to said input connection.

References Cited in the file of this patent

UNITED STATES PATENTS

| | | |
|---|---|---|
| 2,639,425 | Russell et al. | May 19, 1953 |
| 2,642,550 | Williams | June 16, 1953 |
| 2,706,264 | Anderson | Apr. 12, 1955 |